Dec. 12, 1967   R. B. NEALE   3,357,290
ATTACHING OF CUTTING TIPS TO SHANKS OR BODIES OF
CUTTING BLADES AND LOOPERS FOR CARPET MAKING
Filed Jan. 29, 1965   2 Sheets-Sheet 1
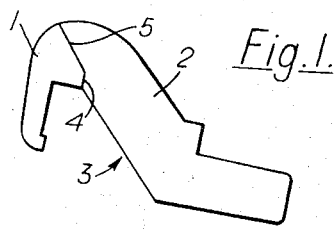
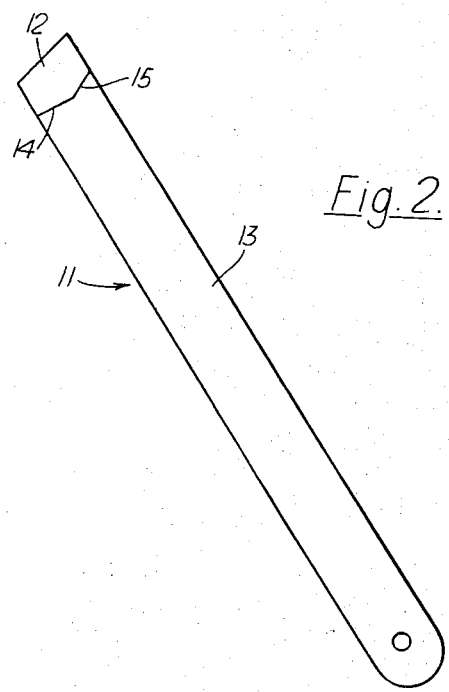
Inventor
R. B. NEALE
By
Holcombe, Wetherill Brisebois
Attorneys Inventor
R. B. NEALE

United States Patent Office 3,357,290
Patented Dec. 12, 1967

3,357,290
ATTACHING OF CUTTING TIPS TO SHANKS OR BODIES OF CUTTING BLADES AND LOOPERS FOR CARPET MAKING
Richard Bernard Neale, Langstone, near Newport, Wales, assignor to Dock Grinding and Engineering Company Limited, Newport, Wales, as tenants in common
Filed Jan. 29, 1965, Ser. No. 429,071
Claims priority, application Great Britain, Feb. 11, 1964, 5,580/64
5 Claims. (Cl. 83—651)

ABSTRACT OF THE DISCLOSURE

Cutting blades and loopers used in the manufacture of tufted carpets and comprising hard cutting tips attached to shanks along surfaces making an obtruse angle with each other by means of a metal shim conforming to said surfaces and soldered to both the cutting tip and the shank.

---

Figure 3:
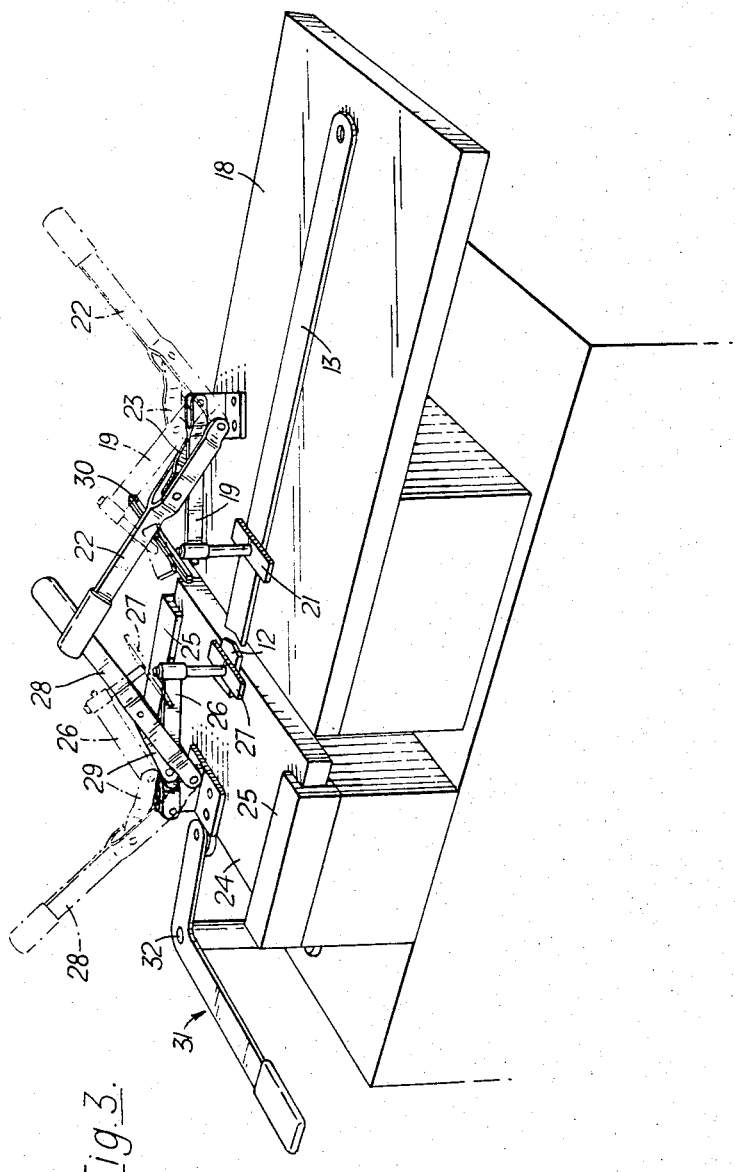

This invention relates to the attaching of cutting tools to the shanks or bodies of cutting blades and loopers for carpet making.

The cutting blades and loopers which are used in the manufacture of tufted carpets have a very narrow elongated cross-section and although efforts have been made over a long period to attach tips, for example of tungsten carbide, to the shanks or bodies of such tools, these efforts have been unsuccessful. Such unsuccessful efforts have included forming a pin or like projection on a tip or a shank which engage in a correspondingly shaped notch on the shank or the tip. It was, therefore, hitherto necessary either to make tufting tools wholly of high speed tool steel having a high tungsten carbide content or to use another steel, for example, spring steel which rapidly loses a cutting edge. In the first alternative, the initial cost of the tools would be high and in the second alternative the cost involved in stopping manufacture in order to sharpen the tools would be great.

The tool according to the invention is provided by attaching cutting tips, for example tungsten carbide cutting tips, to the shanks or bodies of cutting blades and loopers for carpet making, by forming the surfaces to be joined with angularly related portions which make an obtuse angle with each other and soldering a metal shim to the said surfaces.

The invention is illustrated by way of example in the accompanying drawings in which FIG. 1 is a plan view of a looper for use in the manufacture of tufted carpets, FIG. 2 is a plan view of a knife for use in the manufacture of tufted carpets and FIG. 3 is a diagrammatic view of a jig used for soldering tips to the shanks or bodies of the tools shown in FIGS. 1 and 2.

Referring to FIG. 1 of the accompanying drawings, a cutting tip 1 is attached to a shank or body 2 of a looper 3 at a joint surface which is formed with two angularly related portions 4 and 5. These portions make an obtuse angle with each other and in the example shown the angle is approximately 135°. The cutting blade or knife 11 shown in FIG. 2 has a cutting tip 12 which is joined to a shank 13 at a joint surface formed with two portions 14 and 15 which are angularly related in similar manner to the portions 4 and 5 of the looper shown in FIG. 1.

Joint surfaces formed with two angularly related portions as shown in FIGS. 1 and 2 have proved highly successful in practice.

Referring to FIG. 3 of the drawings, a knife shank 13 is shown held to a fixed table 18 by a toggle clamp which comprises a bell-crank lever 19 which is movable about a fixed pivot and which carries a clamping head 21. A hand lever 22, which is pivotally mounted on the table 18, is linked to the lever 19 by a link 23, the linkage being such that when the lever 19 has been moved forward to cause the head 21 to engage the shank 13, further slight movement of the lever 22 causes the link 23 to move over dead centre so that the shank 13 is held firmly to the table 18. The clamping pressure is removed by swinging the lever 22 rearwardly.

A cutting tip 12, which is to be attached to the shank 13, is held firmly to a table 24, which is slidable in fixed guides 25, so that when this table is moved towards the fixed table 18 sufficient pressure can be exerted to cause a copper shim to follow the contour of the angularly related portions of the joint surface and lie closely against these surfaces without the tip 12 or the shank 13 being displaced by the said pressure. The tip is held to the table 24 by a toggle clamp which comprises a bell-crank lever 26 which is movable about a fixed pivot and which carries a clamping head 27. A hand lever 28, which is connected to the lever 26 by a link 29, is arranged to move the head 27 into engagement with a cutting tip 12. The link 29 is arranged to move past a dead centre position when the motion of the lever 28 is continued after the head 27 has engaged the tip 12 so that the tip is firmly held to the table 24.

The soldering operation is carried out as follows. After a knife shank 13 has been clamped to the table 18 by the clamping head 21, a cutting tip 12 is placed on the table 24 and moved manually into engagement with the shank to cause the oppositely facing joint surfaces of the tip and the shank to come into register with each other. The clamping head 27 is then moved to clamp the tip to the table 24. This table is then moved sufficiently far away from the table 18 to enable a strip 30 to be placed between the tip and the shank. The table 24 is then moved towards the table 18 so as to cause the strip 30 to be forced to adopt the contour of the joint surfaces and to lie closely against the angularly related portions of these surfaces. The strip 30 is formed as a sandwich by a central copper shim disposed between two layers of silver solder and when the strip is held between the tip and the shank, the silver solder bears against the surfaces to be joined. A suitable flux, for example borax in water, is brushed on to the joint surfaces before the table 24 is moved to cause the strip 30 to be held by the tip and the shank. An oxyacetylene flame is used to heat the material at the joint to a temperature of, when the silver solder is an alloy of silver, copper and zinc, about 660° C. The tip of the flame is caused to impinge on the tip 12 rather than on the shank 13.

Cutting tips made of a steel having a content of 80% tungsten carbide and 20% cobalt have been successfully attached to knife shanks made of 0.6–0.7% carbon spring steel and 0.5 inch wide and 0.022 inch thick by the method described above. In the case of loopers, the tips have been made of 90% tungsten carbide and 10% cobalt steel, the shanks being 0.45–0.55 carbon steel and having a width at the joint of 0.44 inch and a thickness of 0.056 inch.

The table 24 may be moved towards the table 18 and held in its desired position during a soldering operation by any suitable device. A crank 31 oscillatable about a fixed pivot 32 as shown in FIG. 3 may be used for this purpose.

I claim:

1. A cutting tool for use in the manufacture of carpets and the like, said tool comprising a cutting tip made of a metal having superior edge holding properties, a thin flat shank less than 1/10 of an inch thick and made of a metal which holds an edge less well than that of said tip, each of said shank and tip having a pair of surfaces making an obtuse angle with respect to each other while the surfaces on said shank mate with those on said tip, and a metal shim interposed between and soldered to said mating surfaces.

2. A cutting tool as claimed in claim 1 in which said cutting tip has a tungsten carbide content of at least 80%.

3. A cutting tool as claimed in claim 1 in which said obtuse angle is approximately 135°.

4. A cutting tool as claimed in claim 1 in which said surfaces are flat.

5. A cutting tool as claimed in claim 1 in which said shim is made of copper.

References Cited

UNITED STATES PATENTS

| | | | |
|---|---|---|---|
| 687,653 | 11/1901 | Rivollier | 26—8 |
| 1,933,355 | 10/1933 | Wadsten | 76—107 X |
| 2,617,631 | 11/1952 | Sheperd. | |

JAMES M. MEISTER, *Primary Examiner.*